Figures 1, 2, 4:
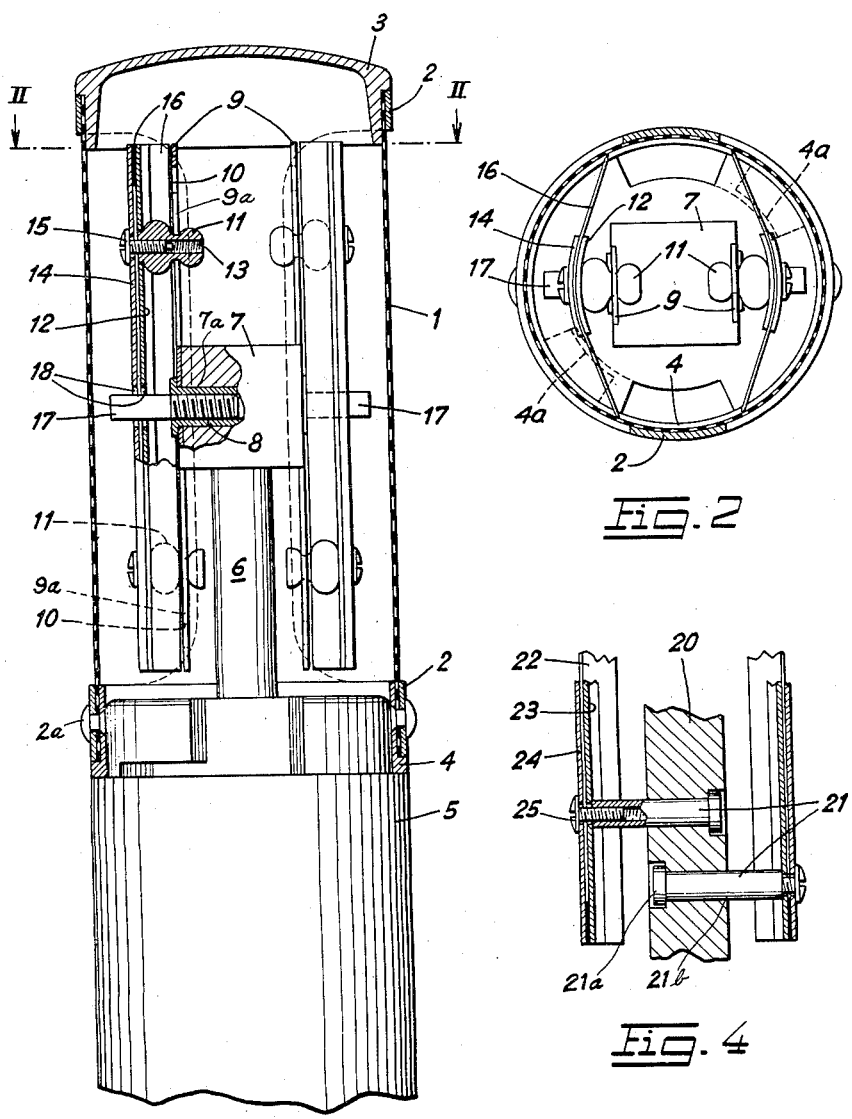

INVENTOR
JEAN SZEMZÖ
BY Irwin S. Thompson
ATTY

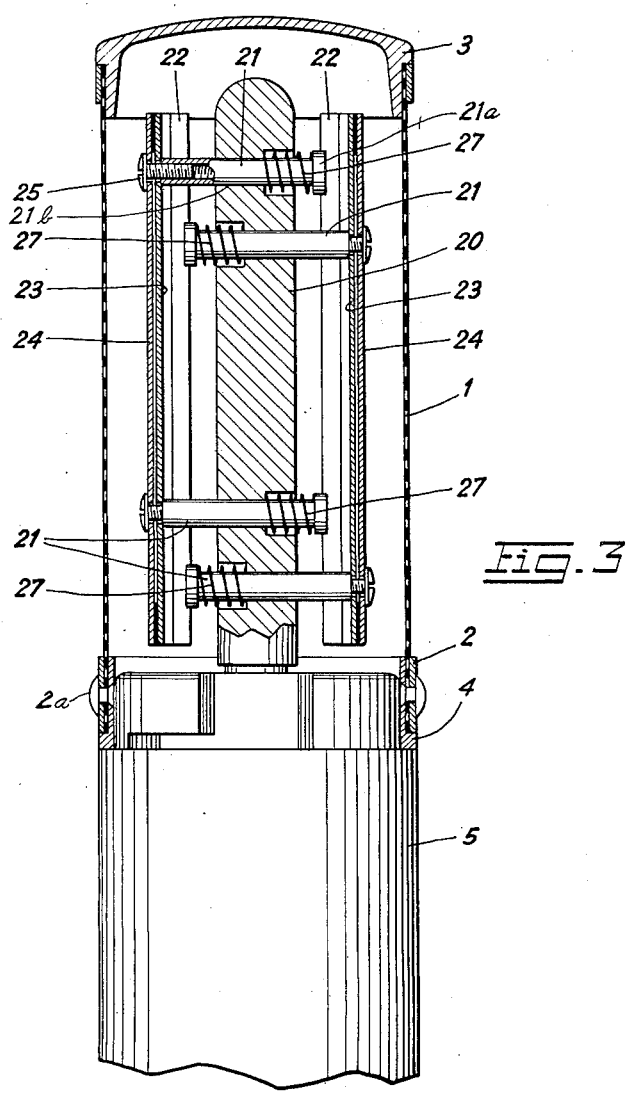

United States Patent Office 3,041,722
Patented July 3, 1962

3,041,722
SHEARING HEAD OF MECHANICAL SHAVER
Jean Szemzö, Bellariastrasse 55, Zurich, Switzerland
Filed May 23, 1958, Ser. No. 737,267
Claims priority, application Switzerland May 27, 1957
6 Claims. (Cl. 30—43)

The present invention relates to shearing heads of mechanical shavers, of the kind comprising a thin-sheet perforated outer shear plate of hollow cylindrical shape and two cutting members carried by a driving member rotating about the axis of the outer shear plate.

In known shearing heads of this type the arrangement is such that the centrifugal forces, due to the mass of the cutting members each including a cutting blade and a blade-carrier guided for radial motion in the driving member, are fully used to press the cutting edges of the cutting blades onto the inner surface of the outer shear plate, in the belief that the contact pressure of the cutting edges on said inner surface should be as great as possible. In one such construction the cutting blade is a spring-steel blade which is flat when the driving member is at rest and the action of the centrifugal forces is used to arch the cutting blades outwards towards the said outer shear plate when said driving member rotates.

In order to minimize the dimensions and the weight of mechanical shavers having a built-in electric motor, so as to obtain an implement that is most convenient to handle, and to allow for use of a small, light and low-priced electric motor, it is essential that the required power of the motor be as low as possible. However, the required power does not depend only on the useful cutting performance of the shaver, but to a large extent also on the friction between the cutting edges and the inner surface of the outer shear plate. This friction is surprisingly high in the shavers of the above-mentioned type in which there is a high contact pressure between the cutting edges and the outer shear plate. Such high friction has the further disadvantage that the outer shear plate soon becomes very hot in the use of the shaver and irritates the skin.

The present invention has for its principal objects to do away with these disadvantages of the dry shavers of the type mentioned above.

According to the invention a shearing head of a shaver is provided, comprising a cylindrical perforated outer shear plate, a power-driven rotatable member extending inside said outer shear plate along the longitudinal axis thereof, two spring-steel cutting blades having parallel cutting edges, clamping means associated with each cutting blade and adapted to hold the middle-portion of the cross-section of such a blade arched outwards towards the outer shear plate, such clamping means forming part of a mounting device so arranged that during operation at normal working speed of said rotatable member the cutting edges of each of said cutting blades exert only a very small pressure on said outer shear plate.

The accompanying drawings represent, by way of example, three embodiments of the invention.

FIG. 1 is a partly sectional view of one embodiment,
FIG. 2 is a cross-section along line II—II of FIG. 1,
FIG. 3 is a longitudinal section of a second embodiment and
FIG. 4 is a partly sectional view similar to FIG. 1, of a portion of a third embodiment.

Referring now to FIGS. 1 and 2, there is shown a thin-sheet perforated outer shear plate 1 of hollow cylindrical shape. This outer shear plate is secured to a stiff supporting member 2 made of sheet-metal and provided with large apertures, together with a cover 3 at one end and a coupling member 4 at the other end. Supporting member 2 is secured to coupling member 4 by any suitable means, such as rivets 2a. According to a conventional practice this coupling member 4 has radially inwardly extending projections or noses 4a by means of which it is removably secured to the casing 5 of the shaver, the parts engaging each other like those of a bayonet-joint. The casing 5 contains a small electric motor which drives a member 6 at constant speed. The member 6 may constitute a portion of the shaft of the motor just mentioned and its axis of rotation is coincident with the longitudinal axis of the outer shear plate 1. Its free end is provided with, or made integral with, a cubic head 7 having a diametrical bore 7a in which an internally threaded sleeve 8 is secured, e.g. by press-fitting and/or riveting. The flanged outer ends of this sleeve 8 are used to hold fast against said head 7 the mid-length portions of two leaf-springs 9 which extend parallelly to the axis of rotation of member 6, one on each of two opposite sides of the head. Each of the leaf-springs 9 has two slits 9a extending on either side of the mid-length portion along the longitudinal center line of the leaf-spring and having each an enlarged end portion 10. In the two slits of each leaf-spring 9 are engaged neck portions of two button members 11 having end portions riveted to an inner clamp plate 12 and having central internally threaded bores 13. The latter are engaged by the thread portions of screws 15 the heads of which overlie an outer clamp plate 14. By means of these two screws the mid-portion of the cross-section of a spring-steel cutting blade 16 having a thickness of about 0.06 millimeter is clamped between the clamping plates 12, 14 which have an arcuated shape in cross-section, whereby the said mid-portion of the cross-section of the blade is arched outwards towards the outer shear plate, as can well be seen in FIG. 2. A pin 17 screwably secured into the corresponding end of the sleeve 8 extends with much transversal play through central holes 18 of the clamp plates 12 and 14 and through one of the usual apertures of the razor blade well obtainable on the market, which constitutes the cutting blade 16, thereby preventing a longitudinal shift of substantial amount of the movable unit comprising the parts 11, 12, 14, 15 and 16. The arrangement is quite the same for the movable unit, pin 17 and leaf-spring 9 located on the diametrically opposite side of the member.

FIGS. 1 and 2 show these movable units and leaf-springs in the position that they occupy when the driving member 6 moves them at normal, substantially constant working speed; the two unsupported or free legs of each leaf-spring are then bent out to extend in a straight line with the supported mid-portion, whereas when member 6 is at rest, they extend along a line curved towards the axis of rotation of member 6. By being so bent out by the centrifugal force acting on each cutting unit, they exert on the buttons 11 of these units a reaction force which almost compensates the centrifugal force whereby only the small surplus of this centrifugal force remains for generating a very small contact pressure of the parallel cutting edges of each cutting blade 16 onto the inner surface of the outer shear plate 1.

In the embodiments shown in FIGS. 3 and 4, respectively, the non-moving parts 1 to 5 inclusive are the same as in the embodiment just described. The driving member 20 extends coaxially to the outer shear plate 1 into proximity of the cover 3 and has four diametrical bores 21b which are enlarged at one of their ends and in each of which a bolt 21 is guided for free motion in radial direction of the member 20. Each pair of bolts 21 is used to carry a spring-steel cutting blade 22 and two clamp plates 23, 24 between which the middle portion of the cross-section of the cutting is held arched outwards towards the outer shear plate as already shown in FIG. 2. The clamping action is exerted by screws 25 which serve also for securing the assembly 22, 23, 24 to one end of the bolts 21. The latter have at their other end a head 21a. A helical compression spring 27 associated to each bolt 21 and partly lodged in the enlargement of the corresponding diametrical bore of member 20 exerts a pressure on the head of this bolt. The two springs 27 act on the bolts 21 of each cutting unit as do the legs of each leaf-spring in the previously described embodiment and should therefore be so dimensioned that when the shaver rotates at normal working speed the forces exerted by them onto the two bolts almost compensate the centrifugal force acting onto the cutting unit whereby the contact pressure of the cutting edges on the inner surface of the outer shear plate is made very small.

The modification partly shown in FIG. 4 differs from the embodiment just described mainly by the fact that the springs 27 are done away with, that the bolts 21 are made somewhat shorter and that the enlargements of the diametrical bores 21b of member 20 are made less deep. When the shaver is in use the heads of the bolts 21 abut against the bottoms of these enlargements or recesses, thereby limiting the motion of the cutting units towards the outer shear plate under centrifugal force so that in operation there is only a very small contact pressure of the cutting edges on the inner surface of the outer shear plate; it should be noted that this result can easily be obtained in practice because the mass of the very thin cutting blades is accordingly small and also because these cutting blades are very flexible.

Many changes could be resorted to without leaving the scope of the invention. The transversal bores 21b serving to guide the bolts 21 might, for example, be provided in a part slidable in a longitudinal diametrical slot of the member 6, such part being retractable from this slit in axial direction together with the cutting units and the outer shear plate when it is desired to have a shearing head easily interchangeable as a whole.

What I claim is:

1. A shearing head of a mechanical shaver comprising a cylindrical perforated shear plate, a power-driven rotatable member extending inside said shear plate along the longitudinal axis thereof, knives mounted on said rotatable member to provide centrifugal shearing contact against the inner periphery of said shear plate upon rotation of said power-driven rotatable member, said member having clamping plates mounted thereon adapted to hold the middle portion of each knife while the outer portions thereof arch outwards toward said shear plate, and limiting means arranged between said member and said clamping plates to provide a compensating effect for limiting the frictional pressure of said knives against said shear plate.

2. A shearing head according to claim 1, in which said limiting means consists of spring means mounted on said member, said spring means having slits therein, button members slidably mounted within said slits, and said clamping plates mounted on said button members.

3. A shearing head according to claim 1, in which said limiting means consists of bolts slidably mounted in spaced apertures in said member, said apertures having enlarged portions, said clamping plates mounted on said bolts, and spring means mounted in the enlarged portions of said apertures.

4. A shearing head according to claim 1, in which said limiting means consists of bolts having heads mounted in spaced apertures in said member, said clamping plates mounted on said bolts, and enlargements of said apertures arranged in the side of said member for said heads to abut against the bottoms of said enlargements.

5. A shearing head of a mechanical shaver comprising a cylindrical perforated shear plate, a power-driven rotatable member extending inside said shear plate along the longitudinal axis thereof, knives mounted on said rotatable member for centrifugal shearing contact against the inner periphery of said shear plate, said member having clamping plates mounted thereon adapted to hold the middle portion of each knife while the outer portions thereof arch outwards toward said shear plate, limiting means arranged between said member and said clamping plates to limit the frictional pressure of said knives against said shear plate, said limiting means consisting of bolts slidably mounted in spaced apertures in said member, said apertures having enlarged portions, said clamping plates mounted on said bolts, and spring means mounted in the enlarged portions of said apertures.

6. A shaving head according to claim 5, in which said clamping plates consist of arcuately-shaped members to insure that the outer portions of each knife are juxtaposed with respect to said shear plate.

References Cited in the file of this patent

UNITED STATES PATENTS

| | | |
|---|---|---|
| 926,509 | Rankin | June 29, 1909 |
| 1,264,605 | Bonham | Apr. 30, 1918 |
| 2,315,274 | Rand | Mar. 30, 1943 |
| 2,319,916 | Breitenstein | May 25, 1943 |
| 2,323,745 | Wildeboor | July 6, 1943 |
| 2,365,861 | Brander | Dec. 26, 1944 |
| 2,541,189 | Barsch | Feb. 13, 1951 |
| 2,757,450 | Szemzo | Aug. 6, 1956 |